(12) United States Patent
James (10) Patent No.: US 9,046,600 B2
(45) Date of Patent: Jun. 2, 2015

(54) METHOD AND APPARATUS FOR INTENSITY CALIBRATION OF MULTI-BEAM LIDAR SENSORS

(71) Applicant: Toyota Motor Engineering & Manufacturing North America, Inc. (TEMA), Erlanger, KY (US)

(72) Inventor: Michael R. James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 236 days.

(21) Appl. No.: 13/705,212

(22) Filed: Dec. 5, 2012

(65) Prior Publication Data

US 2014/0152971 A1   Jun. 5, 2014

(51) Int. Cl.
| | |
|---|---|
| *G01S 17/42* | (2006.01) |
| *G01S 17/89* | (2006.01) |
| *G01S 7/497* | (2006.01) |
| *G01C 15/00* | (2006.01) |

(52) U.S. Cl.
CPC .............. *G01S 17/42* (2013.01); *G01C 15/002* (2013.01); *G01S 17/89* (2013.01); *G01S 7/497* (2013.01)

(58) Field of Classification Search
CPC .......... G01C 3/08; G01S 17/89; G01S 18/002
USPC ................................. 356/3.01–28.5
See application file for complete search history.

(56) References Cited

U.S. PATENT DOCUMENTS

| | | | | |
|---|---|---|---|---|
| 5,825,464 A | * | 10/1998 | Feichtner | 356/4.02 |
| 6,246,468 B1 | * | 6/2001 | Dimsdale | 356/4.02 |

* cited by examiner

*Primary Examiner* — Luke Ratcliffe
(74) *Attorney, Agent, or Firm* — Oblon, McClelland, Maier & Neustadt, L.L.P.

(57) ABSTRACT

A method of multi-beam Lidar intensity measurement calibration including determining, by a positioning device, position information of a moving platform within a global reference frame, collecting a plurality of data points, each data point including the position information and intensity information from a plurality of beams, segmenting the plurality of data points into a plurality of voxels, based on the position information associated with each data point, finding a subset of voxels in the plurality of voxels that include a point corresponding to a certain beam in the plurality of beams and an intensity value in a predetermined neighborhood of a certain intensity value, estimating a probability density based on the subset of voxels, and generating a calibration map that maps the certain intensity value of the certain beam to a calibrated intensity value for the certain beam, based on the probability density and a prior density.

15 Claims, 8 Drawing Sheets

METHOD AND APPARATUS FOR INTENSITY CALIBRATION OF MULTI-BEAM LIDAR SENSORS

FIELD

The present disclosure generally relates to a method and apparatus for intensity calibration of multi-beam Lidar sensors. More specifically, the present disclosure relates to a method and apparatus for intensity calibration of multi-beam Lidar sensors based on probability density estimation.

BACKGROUND

Lidar sensors are getting more sophisticated, often consisting of multiple pairs of laser emitters and receptors, each pair being referred to as a beam. Multi-beam Lidar sensors have significant utility for a variety of automotive applications that include safety applications and autonomous driving. Lidar sensors conventionally provide both a 3D spatial component and a reflectivity measurement of the material being struck by each laser beam. The reflectivity measurement may be a very useful source of information about the environment. However, empirical testing on commercially available Lidar units has shown that calibration of the reflectivity measurement is often poor.

SUMMARY

This disclosure provides a method and/or apparatus for calibration of the reflectivity measurement of a multi-beam Lidar sensor based on probability density estimation.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION

According to an embodiment of the present disclosure, there is provided a method and apparatus for multi-beam Lidar intensity measurement calibration including determining position information of a moving platform within a global reference frame, collecting a plurality of data points, each data point including the position information and intensity information from a plurality of beams, segmenting the plurality of data points into a plurality of voxels based on the position information associated with each of the plurality of data points, finding a subset of voxels from among the plurality of voxels that include a point corresponding to a specific beam from among the plurality of beams and including a specific intensity value, estimating a probability density over the intensity values in all data points in the subset of voxels, and generating a calibration map for the specific beam based on the probability density.

Calibrated Lidar reflectivity measurements may be used for road-paint detection for lane markings, road-sign detection based on high reflectivity, or creation of reflectivity or intensity maps. These maps may be used for vehicle positioning or correction of poor GPS data via localization algorithms.

Figure 1:
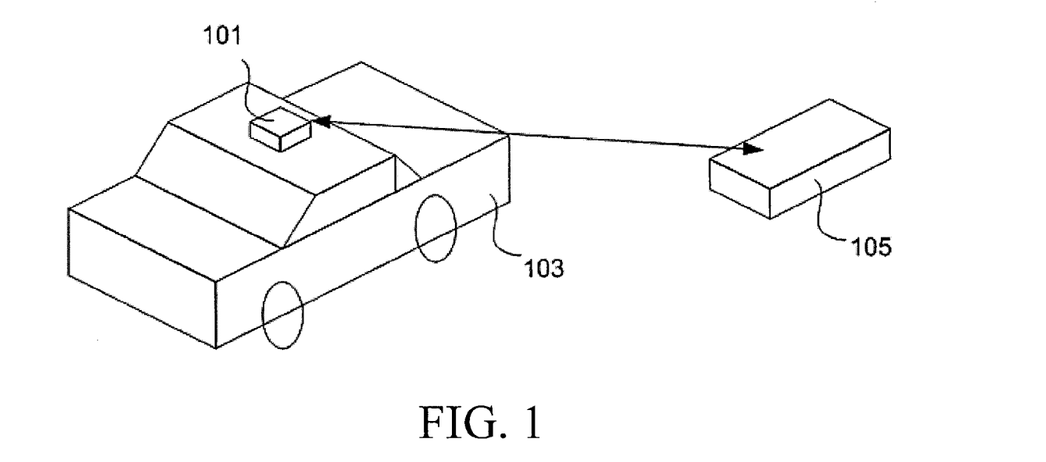
FIG. 1 shows an illustration of a system including a Lidar sensor mounted on a movable platform.

Referring now to the drawings, wherein like reference numerals designate identical or corresponding parts throughout the several views, FIG. 1 shows an illustration of a system including a Lidar sensor 101, mounted on a movable platform 103, and detecting a target 105.

Figure 2:
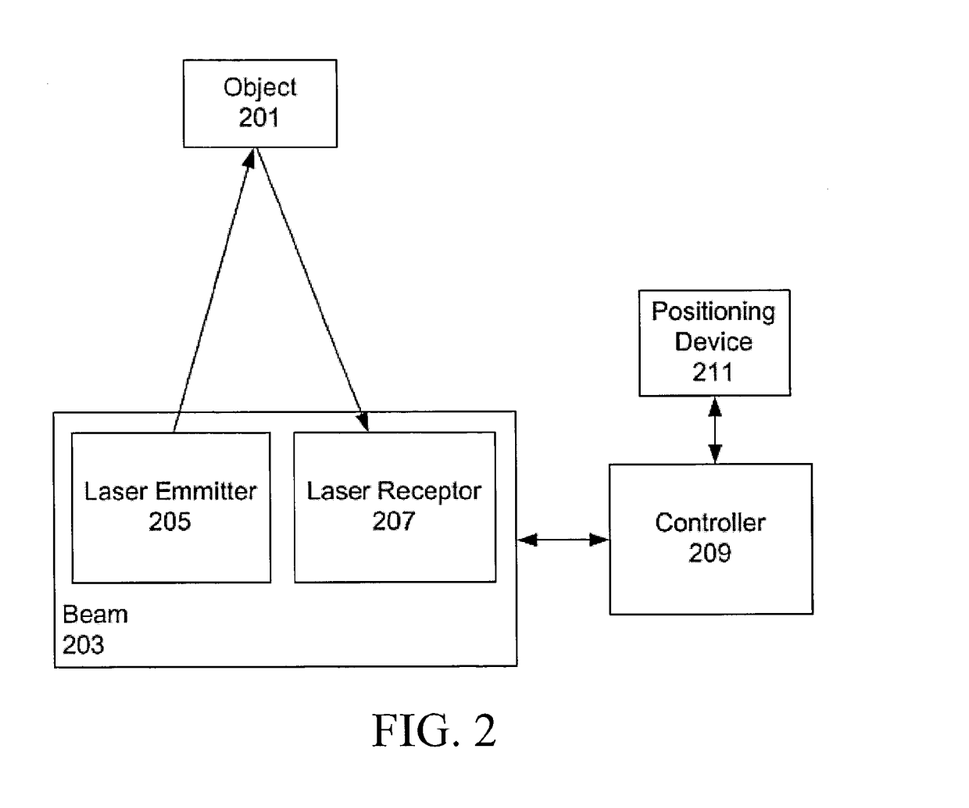
FIG. 2 is a block diagram of a Lidar system.

FIG. 2 is a block diagram of a Lidar system. The Lidar system may include multiple beams 203. Each beam includes a laser emitter 205 and receptor 207 pair. The laser emitter 205 and receptor 207 pair are configured such that a laser signal transmitted by the laser emitter 205 is received by the laser receptor 207 after being reflected by an object 201. A controller 209 controls the functions of the beam 203. The controller also controls a positioning device 211 to determine position information corresponding to data collected from the beam 203.

When mounted on a moving platform 103, different Lidar beams encounter the same target 105 at different times. The Lidar produces a large number of Lidar points p. Each Lidar point includes a 3D coordinate $p_x$, $p_y$, $p_z$ relative to a global coordinate frame, and an intensity measurement $p_r$. The moving platform 103 may compute its position information, so that the points generated by the Lidar are projected into the global coordinate frame. The position information may be computed using, e.g., a wheel odometry device, an inertial measurement device, a global positioning system (GPS), or any combination of these.

Due to inaccuracies and/or physical variations, the intensity returns are highly variable between two different beams, even when hitting the same physical object which is assumed to have relatively consistent reflective properties.

According to an embodiment of the present disclosure, to calibrate the intensity measurements, a large amount of data points from the moving platform 103 is collected and segmented into a large number of small 3D voxels.

Then, for each beam and each possible intensity, the corresponding set of voxels that contain this particular measurement are found, and the probability density over the intensities returned by all beams for those voxels are estimated. The data structures used to collect the data points may include a large 3D array of voxels, and a data structure that indexes into those voxels as explained next. The array of voxels may be constructed so that memory for any given voxel is allocated only when necessary (i.e., when there is a Lidar point that falls within that voxel). Further, as multiple points fall within a given voxel, summary statistics such as the mean intensity of all points currently in that voxel are collected. The data structure that indexes into the voxel array includes a mapping that returns the set of voxels that corresponds to each beam and discrete intensity value. For example, beam 32 and intensity value 127 has a set of voxels corresponding to the times that beam 32 has measured intensity 127. That set of voxels forms the statistics of the probability density used (in the basic probability density estimation algorithm as will be described later) for the calibration of beam 32, intensity 127.

Finally, given the estimated probability density and a prior density, for each beam independently, a calibration map from measured (input) to calibrated (output) intensities is generated. This mapping is the maximum likelihood of the posterior density. Different embodiments of this method are described next with reference to FIGS. 3-6.

Figure 3:
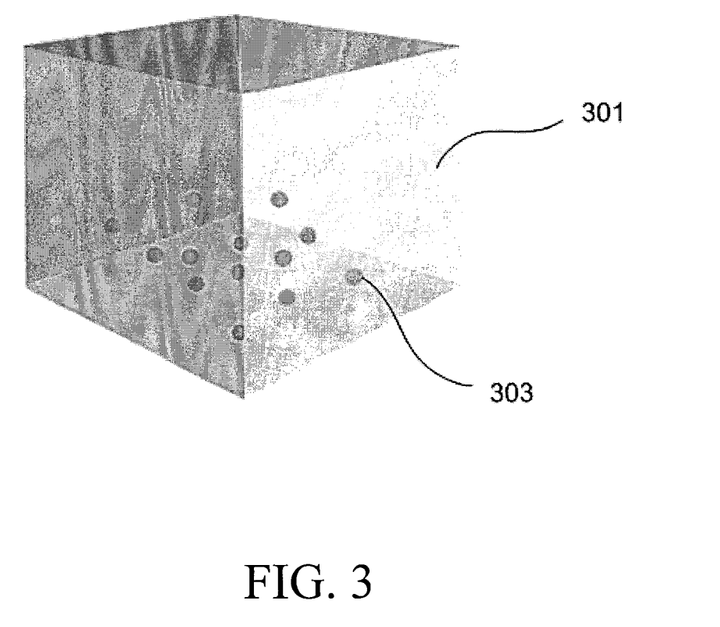
FIG. 3 is an illustration of a single voxel containing a collection of points.

FIG. 3 is an illustration of a single voxel 301 containing a collection of points 303. The set of all points p∈P and all voxels v∈V are processed to produce the sets $P_v$ of Lidar points in each voxel v, and the sets $V(l_i,r_j)$ of voxels that contain a point p from laser $l_i$ with intensity $r_j$.

According to an embodiment of the present disclosure, the method used to estimate the probability density is a weighted kernel-based approach. This algorithm uses the set $V_{l_i,r_j}$ of voxels that contain a point p from laser $l_i$ with intensity rj to construct the density estimate. Each voxel $v_k$ computes the average intensity $r_{v_k}$ of all points falling within it $$r_{v_k} = \frac{1}{|P_{v_k}|} \sum_{p \in P_{v_k}} p_r \quad (1)$$

which, along with a kernel bandwidth h, defines a kernel as a function $K_h(x-r_{v_k})$ of x for that voxel. Following is an example code for determining the kernel bandwidth. The constants at the beginning of the code are selected based on the range of possible values (e.g., 0-255), and for maintaining smooth PDFs (i.e. having a standard deviation between min-stddev and max-stddev). kernel_density.h_ is the bandwidth and num_points is the total number of points collected in the corresponding voxels.

```
double min_stddev = 10.0;
double max_stddev = 100.;
double stddev_param = 0.4;
    if(num_points == 0) {
        kernel_density.h_ = max_stddev;
    } else {
        kernel_density.h_ = max_stddev * 1./ (pow((double)num_points
/ 1000, stddev_param));
        if(kernel_density.h_ < min_stddev) {
            kernel_density.h_ = min_stddev;
        }
    }
```

The basic probability density function (of x) for Laser $l_i$ and intensity $r_j$ is $$p_{l_i,r_j}(x) = \frac{1}{|V_{l_i,r_j}|} \sum_{v \in V_{l_i,r_j}} K_h(x-r_v) \quad (2)$$

Figure 4:
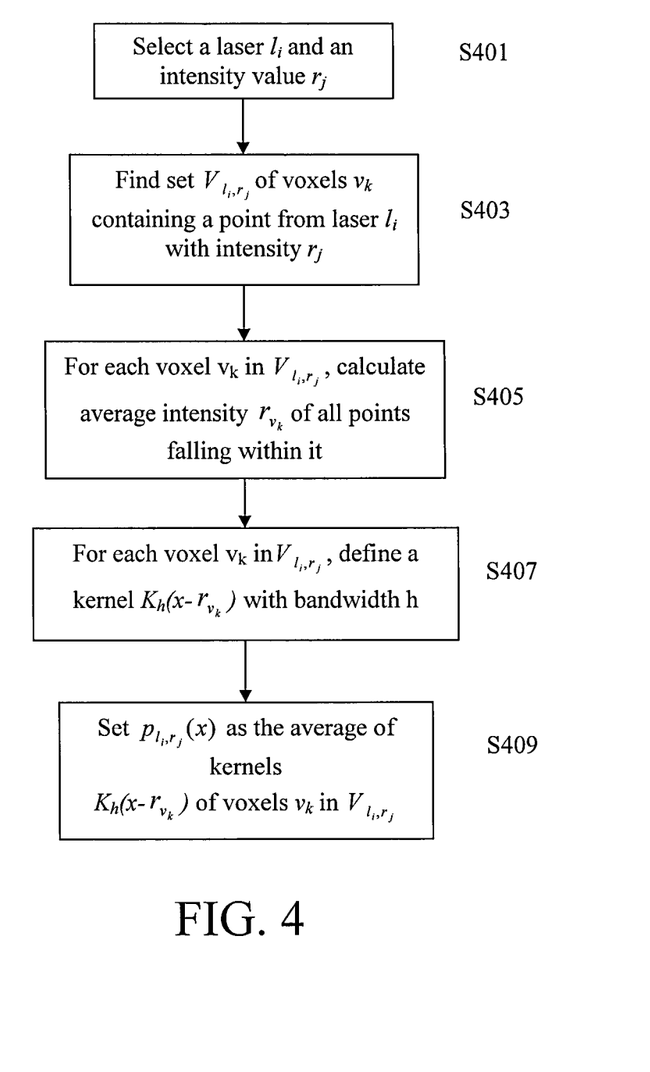
FIG. 4 is a flowchart for basic probability density estimation.

FIG. 4 is a flowchart of an embodiment of the above-described method for estimating the probability density over calibrated (output) intensities for each beam $l_i$ and measured (input) intensity $r_j$.

In step S401, a laser $l_i$ and an intensity value $r_j$ are selected.

In step S403, the set $V_{l_i,r_j}$ of voxels $v_k$ that contain a point p from laser $l_i$ with intensity $r_j$ is determined.

In step S405, for each voxel $v_k$ in $V_{l_i,r_j}$, the average intensity $r_{v_k}$ of all points falling within it are computed.

In step S407, for each voxel $v_k$ in $V_{l_i,r_j}$, a kernel with bandwidth h is defined as a function $K_h(x-r_{v_k})$ of x.

In step S409, the average of kernels $K_h(x-r_{v_k})$ of voxels $v_k$ in $V_{l_i,r_j}$ is set as the density estimate $p_{l_i,r_j}(x)$.

The derived density estimates for neighboring input intensities (e.g. $r_j$ and $r_j \pm 1$ when intensities are measured in integers) are independent, unless some of the voxels used for these estimates are shared (e.g. unless $V_{l_i,r_j} \cap V_{l_i,r_j+1} \neq \emptyset$). This independence may result in a calibration map that is relatively smooth, and may result in poor calibration in under-sampled regions of the intensity space.

The voxel size may be manually tuned to correspond to the range of the Lidar sensor and a typical minimum size of objects encountered in the environment. For example, for a Lidar that can report beyond 50 meters, a voxel size of 20 cm may be used in a road and/or parking lot environment.

According to another embodiment of the present disclosure, an extended algorithm is provided that generates an estimate based on weighted kernels from voxels corresponding to neighboring input intensities. The effective number of neighbors and the weights are parameters of the extended probability density estimation algorithm, specified by an additional kernel bandwidth $h_n$.

The extended probability density function makes use of two kernel bandwidths, one for neighboring input intensities $h_n$ and one for each voxel's contribution h. The extended probability density function (of x) for Laser $l_i$ and intensity $r_j$ is $$p_{l_i,r_j}(x) = \frac{1}{|R|} \sum_{r \in R} K_{h_n}(r-r_j) \frac{1}{|V_{l_i,r}|} \sum_{v \in V_{l_i,r}} K_h(x-r_v) \quad (3)$$

Figure 5:
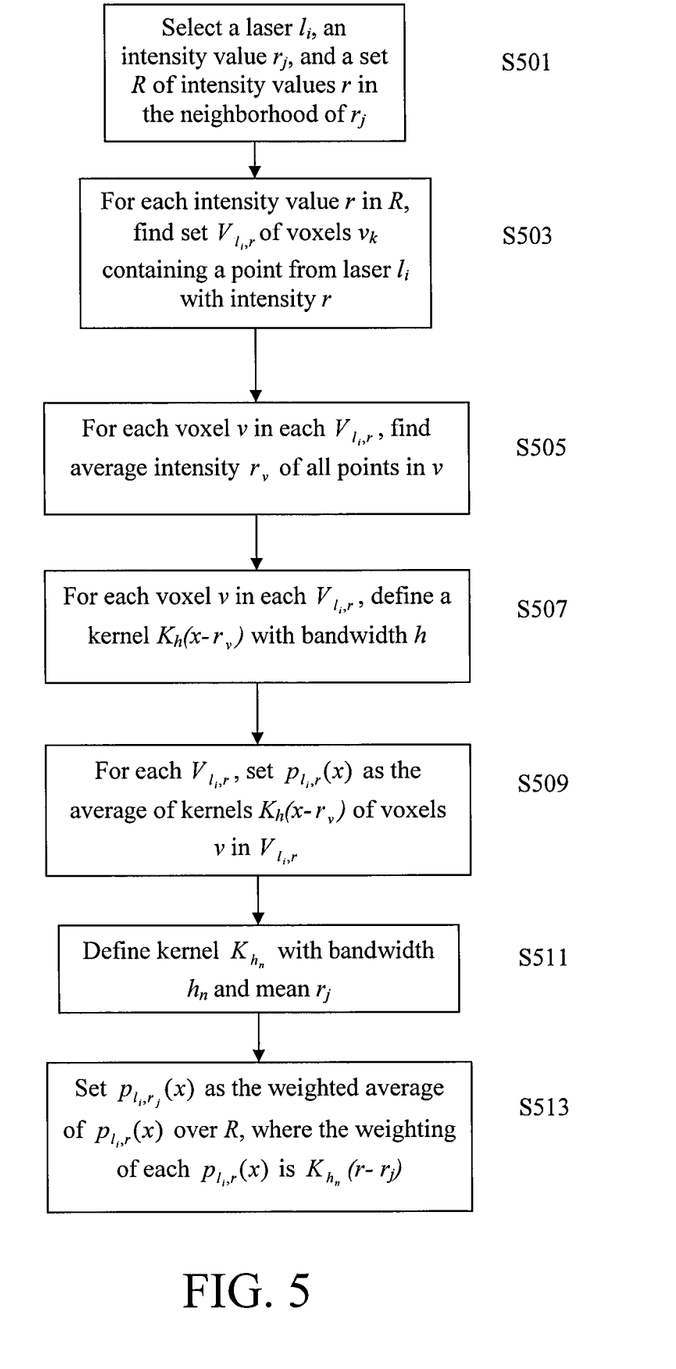
FIG. 5 is a flowchart for extended probability density estimation.

FIG. 5 is a flowchart for extended probability density estimation, according to this embodiment.

In step S501, a laser $l_i$, an intensity $r_j$, and a set R of neighboring intensity values r are selected.

In step S503, for each intensity value r in R, the set $V_{l_i,r}$ of voxels v that contain a point p from laser $l_i$ with intensity r are determined.

In step S505, for each voxel v in each set $V_{l_i,r}$, the average intensity $r_v$ of all points falling within voxel v are computed.

In step S507, for each voxel v in each set $V_{l_i,r}$, a kernel with bandwidth h is defined as a function $K_h(x-r_v)$ of x.

In step S509, for each set $V_{l_i,r}$, the average of kernels $K_h(x-r_v)$ of voxels v is set as the density estimate $p_{l_i,r}(x)$.

In step S511, a kernel $K_{h_n}$ with bandwidth $h_n$ and mean $r_j$ is defined.

In step S513, $p_{l_i,r_j}(x)$ is set as the weighted average of $p_{l_i,r}(x)$ over R, where the weighting of each $p_{l_i,r}(x)$ is $K_{h_n}(r-r_j)$.

The calibration map may be generated based on the probability density estimates according to any of the above-described embodiments. The calibration map is a deterministic mapping $M(i,j) \rightarrow \hat{r}$, with an entry for every laser $l_i$ input intensity $r_j$ pair to an output intensity $\hat{r}$. The calibration map is used to correct the reported intensity values as data is being read from the Lidar.

According to an embodiment of the present invention, to generate the calibration map, the estimated probability density is combined with a Gaussian prior using Bayes rule, and the resulting maximum likelihood density is chosen as the mapped output value. Integer intensity values in the range [0, 255] result in integer output intensity values in the same range.

Figure 7:
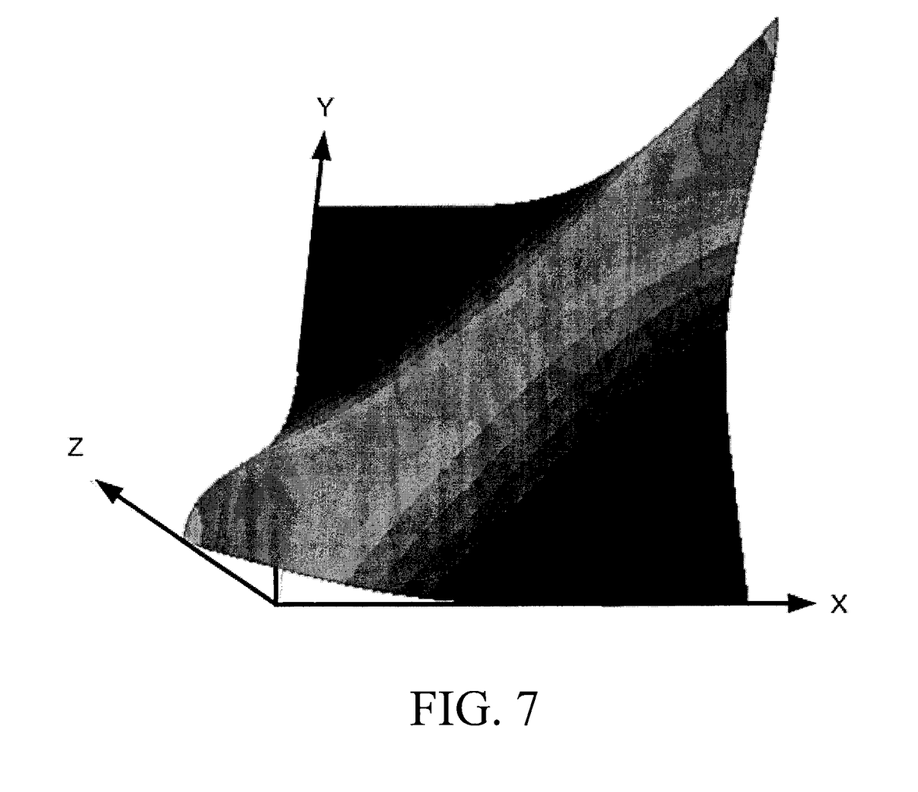
FIG. 7 is a graph of an exemplary prior density.

An example of a prior density $p(M(i,j)=\hat{r})$ is shown in FIG. 7. The x axis corresponds to the input intensity $r_j$, and the y axis corresponds to the output $\hat{r}$. The z axis is the maximum likelihood density. The same prior is used for all lasers $l_i$. According to an embodiment of the present disclosure, for laser $l_i$ and input intensity $r_j$, the prior $p(M(i,j)=\hat{r})$ is defined by starting with a Gaussian with mean $r_j$ and standard deviation σ, cropping to the range of possible intensity values, and re-normalizing. The prior has a standard deviation of 50, and is cropped to the range [0, 255]. Applying Bayes rule for incorporating evidence e, gives:

$$p(M(i,j)=\hat{r}|e)=\alpha p(e|M(i,j)=\hat{r})p(M(i,j)=\hat{r}) \quad (4)$$

where the probability density function $p_{l_i,r_j}(x)$ is used as evidence, and α is the normalization factor, resulting in:

$$p(M(i,j)=\hat{r}|e)=\alpha p_{l_i,r_j}(\hat{r})p(M(i,j)=\hat{r}). \quad (5)$$

The calibration map is therefore:

$$M(i,j) = \underset{\hat{r}}{\operatorname{argmax}} p_{l_i,r_j}(\hat{r})p(M(i,j)=\hat{r}) \quad (6)$$

The normalization factor may be dropped as it is a constant for all i, j.

Figure 6:
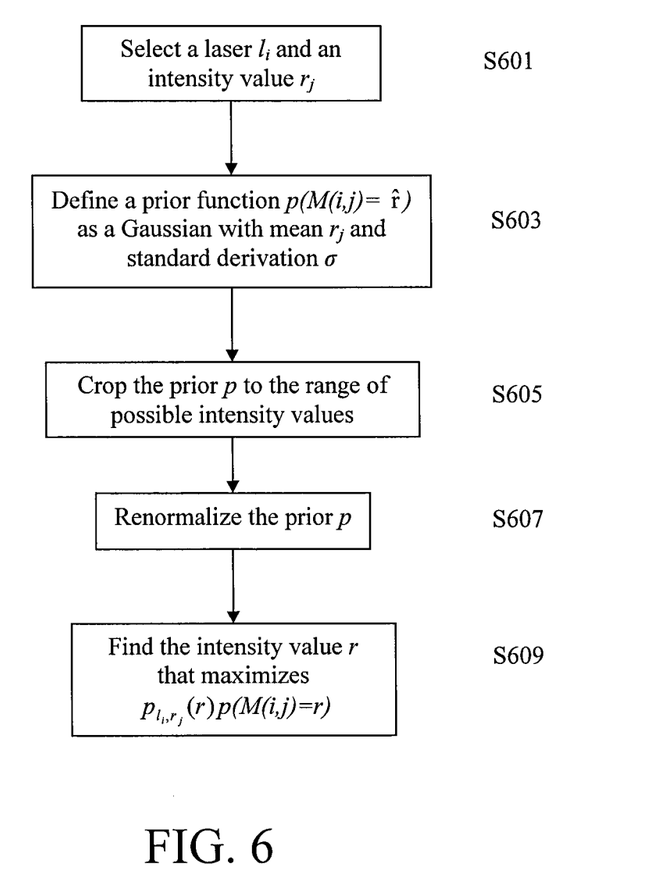
FIG. 6 is a flowchart for calibration map generation.

FIG. 6 is a flowchart for calibration map generation, according to an embodiment of the present disclosure.

In step S601, a laser $l_i$ with intensity $r_j$ are selected.

In step S603, a prior function $p(M(i,j)=\hat{r})$ is defined as a Gaussian with mean and standard deviation σ.

In step S605, the prior p is cropped to the range of possible intensity values.

In step S607, the prior p is renormalized.

In step S609, the intensity value r that maximizes $p_{l_i,r_j}(r)p(M(i,j)=r)$ is determined.

Figure 8A:
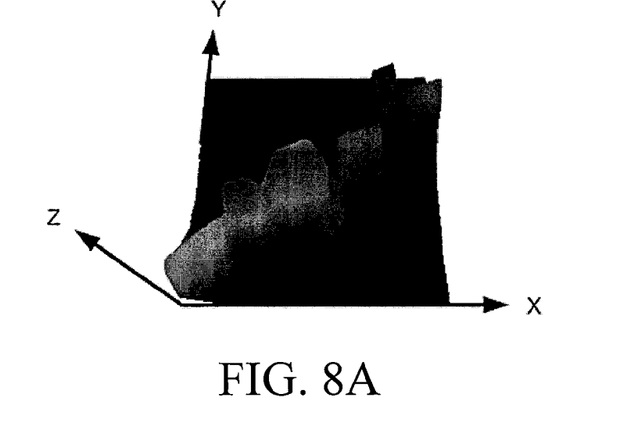
FIGS. 8A-C are graphs of density estimates for three different beams.
Figure 8B:
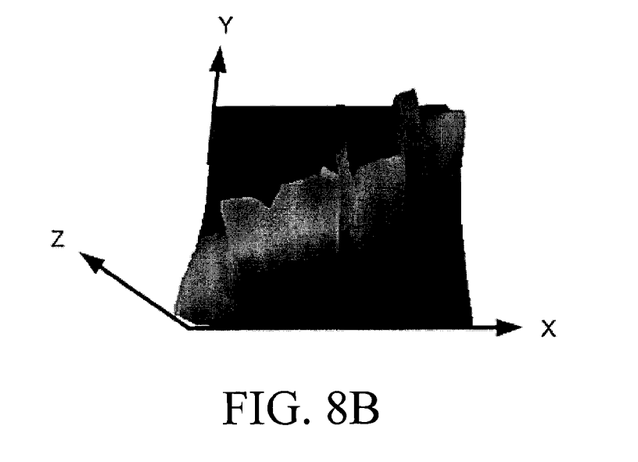
Figure 8C:
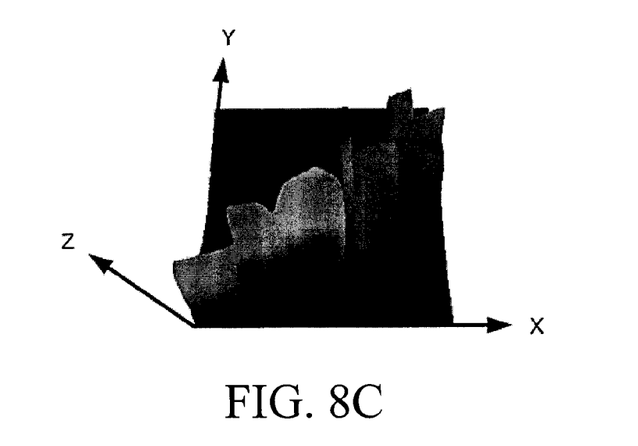

FIGS. 8A-C show final density estimate $p(M(i,j)=\hat{r}|e)$ incorporating both prior and gathered evidence for three different beams. The x axis is the input intensity (as reported by the sensor), and the y axis is the output (corrected) intensity. The height corresponds to the likelihood. The final calibration map is generated directly from these probabilities.

The resulting data can be used in applications such as road-paint detection for lane markings, road-sign detection based on high-reflectivity returns, and the creation of intensity maps to be used for vehicle positioning and localization.

Figure 9:
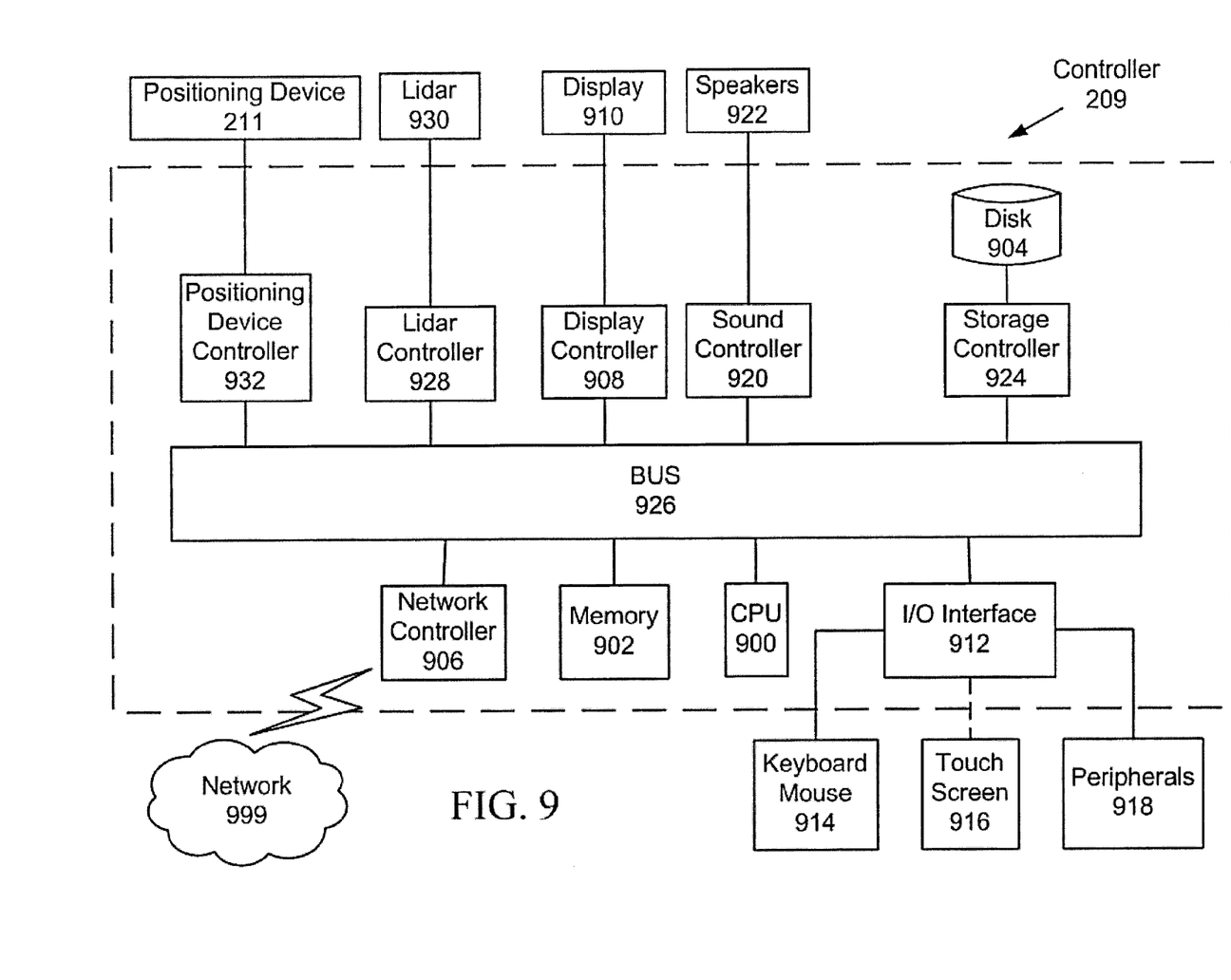
FIG. 9 shows a block diagram of a controller.

Next, a hardware description of the controller 209 according to exemplary embodiments is described with reference to FIG. 9. In FIG. 9, the controller 209 includes a CPU 900 which performs the processes described above. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 209 communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The controller 209 in FIG. 9 also includes a network controller 906, such as an Intel Ethernet PRO network interface card from Intel Corporation of America, for interfacing with network 999. As can be appreciated, the network 999 can be a public network, such as the Internet, or a private network such as an LAN or WAN network, or any combination thereof and can also include PSTN or ISDN sub-networks. The network 999 can also be wired, such as an Ethernet network, or can be wireless such as a cellular network including EDGE, 3G and 4G wireless cellular systems. The wireless network can also be WiFi, Bluetooth, or any other wireless form of communication that is known.

The controller 209 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface 912 also connects to a variety of peripherals 918 including printers and scanners, such as an OfficeJet or DeskJet from Hewlett Packard.

A sound controller 920 is also provided in the controller 209, such as Sound Blaster X-Fi Titanium from Creative, to interface with speakers/microphone 922 thereby providing sounds and/or music. The speakers/microphone 922 can also be used to accept dictated words as commands for controlling the controller 209 or for providing location and/or property information with respect to the target property.

The general purpose storage controller 924 connects the storage medium disk 904 with communication bus 926, which may be an ISA, EISA, VESA, PCI, or similar, for interconnecting all of the components of the controller 209. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The Lidar controller 928 connects the Lidar 930 with communication bus 926, so that the Lidar 930 may be controlled via CPU 900, and data collected by Lidar 930 may be stored in Disk 904. CPU 900 may use data collected by Lidar 930 to provide information via speaker 922 or display 910.

The positioning device controller 932 connects the positioning device 211 with communication bus 926, so that the positioning device 211 may be controlled via CPU 900, and position information may be stored in Disk 904 in association with the data collected by Lidar 930.

Initial calibration information or other settings for Lidar 930 may be provided to controller 209 via network 999, keyboard/mouse 914, touch screen 916, or peripherals 918.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method of multi-beam Lidar intensity measurement calibration comprising:
    determining, by a positioning device, position information of a moving platform within a global reference frame;
    collecting a plurality of data points, each data point including the position information and intensity information from a plurality of beams;
    segmenting the plurality of data points into a plurality of voxels, based on the position information associated with each data point;
    finding a subset of voxels in the plurality of voxels that include a point corresponding to a certain beam in the plurality of beams and an intensity value in a predetermined neighborhood of a certain intensity value;
    estimating a probability density based on the subset of voxels; and
    generating a calibration map that maps the certain intensity value of the certain beam to a calibrated intensity value for the certain beam to be used for at least one of positioning and localization of the moving platform, based on the probability density and a prior density.

2. The method of claim 1, wherein estimating the probability density comprises:
    finding an average intensity value for each voxel in the subset of voxels;
    defining, for each voxel in the subset of voxels, a kernel with a predetermined bandwidth and a mean equal to the average intensity value for that voxel; and
    finding, for each intensity value in the predetermined neighborhood of the intensity values, the probability density generated by the kernels of the voxels corresponding to that intensity value.

3. The method of claim 2, wherein estimating the probability density further comprises:
    finding a weighted average of average kernels of the subset of voxels, based on a weighting kernel function with a predetermined weighting bandwidth and a weighting mean equal to the certain intensity value.

4. The method of claim 1, wherein the prior density function is a Gaussian density function.

5. The method of claim 1, wherein the calibration map is a maximum likelihood calibration map.

6. The method of claim 1, wherein the positioning device includes one or more of a wheel odometry device, an inertial measurement device, or a global positioning system (GPS).

7. An apparatus for multi-beam Lidar intensity measurement calibration comprising:
    a data acquisition unit which collects a plurality of data points, each data point including position information of a moving platform and intensity information from a plurality of beams; and
    a processor configured to
        segment the plurality of data points into a plurality of voxels, based on the position information associated with each data point,
        find a subset of voxels in the plurality of voxels that include a point corresponding to a certain beam in the plurality of beams and an intensity value in a predetermined neighborhood of a certain intensity value;
        estimate a probability density based on the subset of voxels; and
        generate a calibration map that maps the certain intensity value of the certain beam to a calibrated intensity value for the certain beam to be used for at least one of positioning and localization of the moving platform, based on the probability density and a prior density.

8. The apparatus of claim 7, wherein the processor is further configured to
    find an average intensity value for each voxel in the subset of voxels;
    define, for each voxel in the subset of voxels, a kernel with a predetermined bandwidth and a mean equal to the average intensity value for that voxel; and
    find, for each intensity value in the predetermined neighborhood of the intensity values, a probability density generated by the kernels of the voxels corresponding to that intensity value.

9. The apparatus of claim 8, wherein the processor is further configured to find a weighted average of average kernels of the subset of voxels, based on a weighting kernel function with a predetermined weighting bandwidth and a weighting mean equal to the certain intensity value.

10. The apparatus of claim 7, wherein the processor uses a Gaussian density function as the prior density function.

11. The apparatus of claim 7, wherein the processor generates a maximum likelihood calibration map as the calibration map.

12. The apparatus of claim 7, wherein the position information is based on one or more of a wheel odometry device, an inertial measurement device, or a global positioning system (GPS).

13. A non-transitory computer-readable medium storing a program that, when executed by a processor, causes the processor to perform a method of multi-beam Lidar intensity measurement calibration comprising:
    determining, by a positioning device, position information of a moving platform within a global reference frame;
    collecting a plurality of data points, each data point including the position information and intensity information from a plurality of beams;
    segmenting the plurality of data points into a plurality of voxels, based on the position information associated with each data point;
    finding a subset of voxels in the plurality of voxels that include a point corresponding to a certain beam in the plurality of beams and an intensity value in a predetermined neighborhood of a certain intensity value;
    estimating a probability density based on the subset of voxels; and
    generating a calibration map that maps the certain intensity value of the certain beam to a calibrated intensity value for the certain beam to be used for at least one of positioning and localization of the moving platform, based on the probability density and a prior density.

14. A multi-beam Lidar intensity measurement calibration system comprising:
    a positioning device which determines position information of a moving platform;
    a source which generates a plurality of beams;

a data acquisition unit which collects a plurality of data points, each data point including the position information and intensity information from the plurality of beams; and a processor configured to
- segment the plurality of data points into a plurality of voxels, based on the position information associated with each data point,
- find a subset of voxels in the plurality of voxels that include a point corresponding to a certain beam in the plurality of beams and an intensity value in a predetermined neighborhood of a certain intensity value;
- estimate a probability density based on the subset of voxels; and
- generate a calibration map that maps the certain intensity value of the certain beam to a calibrated intensity value for the certain beam to be used for at least one of positioning and localization of the moving platform, based on the probability density and a prior density.

15. The system of claim 14, wherein the positioning device includes one or more of a wheel odometry device, an inertial measurement device, or a global positioning system (GPS).

* * * * *